US009106326B2

(12) United States Patent
Traverso

(10) Patent No.: US 9,106,326 B2
(45) Date of Patent: Aug. 11, 2015

(54) METHOD FOR DETERMINING THE IMPERFECTIONS OF A TRANSMIT PATHWAY AND OF A RECEIVE PATHWAY OF AN APPARATUS, AND ASSOCIATED RADIO APPARATUS

(71) Applicant: THALES, Neuilly-sur-Seine (FR)

(72) Inventor: Sylvain Traverso, Gennevilliers (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/498,810

(22) Filed: Sep. 26, 2014

(65) Prior Publication Data

US 2015/0092827 A1     Apr. 2, 2015

(30) Foreign Application Priority Data

Sep. 27, 2013  (FR) ...................................... 13 02251

(51) Int. Cl.
  H04B 3/46      (2015.01)
  H04B 17/00     (2015.01)
  H04L 27/26     (2006.01)

(52) U.S. Cl.
  CPC ............ *H04B 17/00* (2013.01); *H04L 27/2601* (2013.01)

(58) Field of Classification Search
  CPC .............. H04L 1/20; H04L 1/24; H04B 3/46; H04B 17/0042; H04B 17/004
  USPC ........................................................ 375/224
  See application file for complete search history.

(56) References Cited

U.S. PATENT DOCUMENTS

| 7,184,714 | B1 * | 2/2007 | Kutagulla et al. | 455/73 |
| 7,366,255 | B1 * | 4/2008 | Hwang et al. | 375/324 |
| 2003/0231726 | A1 * | 12/2003 | Schuchert et al. | 375/350 |
| 2004/0203472 | A1 * | 10/2004 | Chien | 455/68 |
| 2006/0056554 | A1 * | 3/2006 | Lin et al. | 375/350 |
| 2006/0198475 | A1 * | 9/2006 | Wu et al. | 375/346 |
| 2007/0280380 | A1 * | 12/2007 | Cho et al. | 375/332 |
| 2008/0273608 | A1 * | 11/2008 | Jonsson | 375/260 |
| 2008/0279221 | A1 * | 11/2008 | Wen et al. | 370/500 |
| 2008/0310534 | A1 | 12/2008 | Egashira et al. | |
| 2011/0092168 | A1 * | 4/2011 | Pan | 455/67.13 |
| 2011/0292978 | A1 | 12/2011 | Kravitz | |
| 2013/0238262 | A1 * | 9/2013 | Asami | 702/58 |

FOREIGN PATENT DOCUMENTS

WO       2008116821 A1    10/2008

OTHER PUBLICATIONS

Yabo Li, et al., "A New Method to Simultaneously Estimate TX/RX IQ Imbalance and Channels for OFDM Systems", 2013 IEEE International Conference on Signal Processing for Communications Symposium, Jun. 9, 2013, pp. 4551-4555, XP032522459.

Behzad Razavi, "Design Considerations for Direct-Conversion Receivers", IEEE Transactions on circuits and Systems—II: Analog and Digital Signal Processing, Jun. 1997, pp. 428-435, vol. 44, No. 6, IEEE.

\* cited by examiner

*Primary Examiner* — Juan A Torres
(74) *Attorney, Agent, or Firm* — Baker & Hostetler LLP

(57) ABSTRACT

A method is provided for determining the imperfections of a transmit pathway and of a receive pathway of an apparatus, and associated radio apparatus, the transmit pathway comprising a first device for frequency transposition of an analogue sequence to an analogue signal, using a first transposition frequency, the receive pathway comprising a second device for frequency transposition of an analogue signal to an analogue sequence, using a second transposition frequency different from the first transposition frequency.

12 Claims, 5 Drawing Sheets

US 9,106,326 B2

METHOD FOR DETERMINING THE IMPERFECTIONS OF A TRANSMIT PATHWAY AND OF A RECEIVE PATHWAY OF AN APPARATUS, AND ASSOCIATED RADIO APPARATUS

CROSS-REFERENCE TO RELATED APPLICATION

This application claims priority to foreign French patent application No. FR 1302251, filed on Sep. 27, 2013, the disclosure of which is incorporated by reference in its entirety.

FIELD OF THE INVENTION

The present invention relates to a method for determining the imperfections of the transmit and receive pathways of an apparatus. This invention pertains to the field of apparatuses requiring an entirely analogue or partially analogue frequency transposition, for example apparatuses for radio communications, communication via an optical fibre or via an audio transmission. This frequency transposition is carried out by the transmit pathway and the receive pathway of the apparatus.

The invention pertains more particularly to the use of an entirely digital method for calibrating an apparatus making it possible to estimate and to compensate, digitally, the imbalances between the in-phase part and the quadrature part of the signal and which are present in the transposed signal (solely the imperfections of the transmitter) and in the baseband signal received (the imperfections of the transmitter and of the receiver). These two phenomena are due to the analogue imperfections present in the transmit pathway and the receive pathway of the apparatus. The transmit pathway is also known by the expression IQ modulator and the receive pathway by the expression IQ demodulator.

BACKGROUND

If an apparatus comprises a function for transposing from baseband to the carrier frequency (and conversely, from the carrier to baseband) achieved entirely or partially in an analogue manner, it is necessary to use an IQ modulator for the transmit pathway, and an IQ demodulator for the receive pathway. This IQ modulator and this IQ demodulator are in general impacted by the loss of quadrature between the in-phase pathway (also known by the expression I pathway) and the quadrature pathway (also known by the expression Q pathway). This is illustrated in FIG. 1 and FIG. 2. In FIG. 1 the in-phase pathway is represented by the element $fe_I(t)$ and the quadrature pathway by the element $fe_Q(t)$. In FIG. 2 the in-phase pathway is represented by the element $fr_I(t)$ and the quadrature pathway by the element $fr_Q(t)$. This quadrature loss is also known by the expression "TX IQ imbalance" and "RX IQ imbalance". This quadrature loss has significant effects, indeed the least mismatch of phase and/or gain between the I and Q pathways gives rise to a quadrature loss resulting in a self-jamming of the signal transmitted (or received) by itself. This quadrature loss is represented in FIGS. 1 and 2 by the gains $g_{Tx}$ and $g_{Rx}$ and the phases $\phi_{Tx}$ and $\phi_{Rx}$, note that if the transmit pathway is not affected by an imbalance then $\phi_{Tx}=0$ and $g_{Tx}=1$ and if the receive pathway is not affected by an imbalance then $\phi_{Rx}=0$ and $g_{Rx}=1$. The level of this self-jamming is all the more significant the higher the quadrature loss.

FIGS. 3 and 4 present the effect of this self-jamming between the various signals. In FIG. 3 the elements a), b) and c) correspond respectively to:
the frequency response $E'^*(-f)$ of the image signal $e'^*(t)$,
the frequency response $E'(f)$ of the signal to be transmitted $e(t)$ and
the frequency response $\hat{S}(f)$ of the signal transmitted.
The central carrier represents the resultant carrier. The signal transmitted is jammed at one and the same time by its image.
In FIG. 4 the elements a) and b) correspond respectively to:
the frequency response of the signal at the input of the IQ demodulator, and
the frequency response $R'(f)$ of the signal affected by the IQ imbalance and the continuous component.
The central carrier represents the continuous component, and $H(f)$ the frequency response of the channel. In this example, it is noted that the more frequency selective is the channel, the more significant is the impact of the interference of the signal to be received with its image.

Prior art systems are known which make it possible to compensate for the imperfections of the IQ modulator of the transmit pathway by a pre-compensation, and for the imperfections of the IQ demodulator of the receive pathway by a post-compensation.

FIG. 5 presents a radio post known in the prior art. For example the journal article by B. Razavi, "Design Considerations for Direct-Conversion Receivers," published in the IEEE journal Transaction on Circuits and Systems II: Analog and Digital Signal Processing, vol. 44, pp. 428-435, in June 1997, presents such a radio post. This system comprises a transmit pathway 501 and a receive pathway 502. These two pathways are connected together, before the transmit/receive antenna. This connection can be effected for example by virtue of a switch 503.

The transmit pathway comprises a first device 504 for frequency transposition of the signal. This first transposition device uses a first transposition frequency. Likewise the receive pathway comprises a second device 505 for frequency transposition of the signal. This second transposition device uses a second transposition frequency.

These two transposition devices cause imperfections known by the expression IQ imbalance and resultant carrier.

Finally the transmit pathway 501 and the transmit pathway 502 comprise respectively a digital-analogue converter 506 and an analogue-digital converter 507. These two converters make it possible to convert respectively a digital sequence into an analogue sequence and an analogue sequence into a digital sequence.

In order to compensate for these imperfections the system of the prior art comprises a pre-compensation device 508 and a post-compensation device 509.

If the parameters used by these pre and post-compensations are known perfectly, the combination pre-compensation followed by an imperfect transmit pathway and the combination imperfect receive pathway followed by a post-compensation behave respectively as an ideal transmit pathway and an ideal receive pathway.

Apparatuses are also known in which the transmit and receive pathways are not connected together. In this case the signals exchanged between the transmit and receive pathways pass through the propagation channel between the transmit and receive antennas. It is possible to apply the invention to a system in which the transmit and receive pathways are situated in distinct housings and are linked only by the radio channel.

Prior art systems are also known which make it possible to determine the imperfections and therefore to determine the pre-compensations or the post-compensations to be applied to the signals. For example patent application WO2008/116821 is known, which presents a scheme for determining the imperfections of a device comprising a transmit pathway and a receive pathway. In this document the imperfections are calculated by carrying out the following steps:

The imperfections of the receive pathway are calculated by supposing the imperfections of the transmit pathway to be negligible. The scheme is therefore biased and approximate on account of this supposition.

The imperfections of the transmit pathway are calculated on the basis of the imperfections of the receive pathway.

The imperfections of the receive pathway are updated on the basis of the imperfections of the transmit pathway.

The scheme of this method is therefore iterative.

The method, described in document WO2008/116821, for determining the imperfections of the transmit pathway and of the receive pathway, is therefore iterative, approximate and biased. Moreover in this method an assumption is made about the frequency response of the looped-back transmit/receive device as a whole. Indeed in this patent application the solution presented operates only if the channel between the transmit and receive pathway does not vary or varies little as a function of the analysis frequency.

The assumption made is that the equivalent channel is considered to be constant or equal for two analysis frequencies.

SUMMARY OF THE INVENTION

The present invention proposes a method for determining the imperfections of a transmit pathway and of a receive pathway of an apparatus, in a non-iterative and exact manner, whatever the frequency response of the element making it possible to connect the transmit pathway and the receive pathway.

The method allows the determination of the imperfections of a transmit pathway and of a receive pathway of an apparatus. The transmit pathway comprises a first device for frequency transposition of an analogue sequence to an analogue signal, using a first transposition frequency. The receive pathway comprises a second device for frequency transposition of an analogue signal to an analogue sequence, using a second transposition frequency different from the said first transposition frequency.

The method comprises the following sequential steps:
a step of generating at least two different first analogue sequences,
a step of frequency transposition to analogue signals of the first analogue sequences, by the transmit pathway,
a step of transmitting the analogue signals of the transmit pathway to the receive pathway,
a step of frequency transposition to second analogue sequences of the analogue signals received, by the receive pathway,
a step of calculating first amplitudes and first phases, of a plurality of spectral components of at least two of the first analogue sequences at first frequencies of interest and second amplitudes and second phases, of a plurality of spectral components of at least two of the second analogue sequences at first frequencies of interest.

The method comprises moreover the following two independent steps:
a step of determining the imperfections of the transmit pathway on the basis solely of the first amplitudes, first phases, second amplitudes and/or second phases, and
a step of determining the imperfections of the receive pathway on the basis of the said second amplitudes and second phases.

Advantageously at least two of the first analogue sequences are non-zero, are not a delayed version of one another and are not an amplified version of one another.

Advantageously one of the first analogue sequences consists of an imaginary sequence and another of the first sequences consists of a real sequence.

Advantageously at least two of the first analogue sequences are multi-tone sequences of OFDM—Orthogonal Frequency Division Multiplexing—type or of SC-FDE—Single-Carrier Frequency Domain Equalization—type or of FBMC—Filter Bank MultiCarrier modulation—type or analogue sequences using a cyclic prefix and/or cyclic postfix.

Advantageously the imperfections of the transmit pathway are modelled by a first gain and a first phase shift affecting the said analogue signal during its transmission by the transmit pathway.

Advantageously the imperfections of the receive pathway are modelled by a second gain and a second phase shift affecting the said analogue signal during its reception by the said receive pathway.

Advantageously the transmit pathway furthermore comprises a device for converting first digital sequences to the said first analogue sequences, and the receive pathway furthermore comprises a device for converting the said second analogue sequences to second digital sequences. Moreover the first frequencies of interest are:

$$f_8 = -k_2 \frac{f_{smp}}{Nfft} \text{ and}$$

$$f_9 = k_2 \frac{f_{smp}}{Nfft} = -f_8.$$

where:

$$k_2 \in \left[+1; \frac{Nfft}{2} - 1\right],$$

$f_{smp}$ represents the sampling frequency of the device for converting the second analogue sequences to second digital sequences and Nfft represents a number of samples used to calculate the said second amplitudes and the said second phases, of the said spectral components of the second analogue sequence or sequences.

Thus the frequencies of interest as well as the frequencies transmitted are defined with respect to the receive pathway sampling frequency.

Advantageously the transmit pathway furthermore comprises a device for converting first digital sequences to the said first analogue sequences, and the receive pathway furthermore comprises a device for converting the said second analogue sequences to second digital sequences.

Moreover the first frequencies of interest are:

$$f_1 = (-k_2 - k_1) \frac{f_{smp}}{Nfft},$$

$$f_2 = (-k_2 + k_1) \frac{f_{smp}}{Nfft},$$

-continued $$f_6 = (+k_2 - k_1)\frac{f_{smp}}{Nfft} = -f_2,$$

$$f_7 = (+k_2 + k_1)\frac{f_{smp}}{Nfft} = -f_1,$$

where:

$$k_1 \in \left[-\frac{Nfft}{2} + 1; \frac{Nfft}{2}\right],$$

$$k_1 \frac{f_{smp}}{Nfft} = \Delta f,$$

$\Delta f$ represents the difference between the said first transposition frequency and the said second transposition frequency, $$k_2 \in \left[+1; \frac{Nfft}{2} - 1\right],$$

$f_{smp}$ represents the said sampling frequency of the device for converting the second analogue sequences to second digital sequences and Nfft represents a number of samples used to calculate the said second amplitudes and the said second phases, of the said spectral components of the second analogue sequence or sequences.

Advantageously the step of determining the imperfections of the transmit pathway comprises the use of the following relations:

$$\begin{cases} \varphi_{TX}est = \text{Angle}[K1_{TX}\text{finalest} - K2_{TX}\text{finalest}*] \\ g_{TX}est = |K1_{TX}\text{finalest} - K2_{TX}\text{finalest}*| \end{cases}$$

where:

|a| represents the norm of the complex number a,

Angle[a] represents the argument of the complex number a, $\varphi_{TX}$ represents an estimation of the said first phase shift of the said transmit pathway, $g_{TX}$ represents an estimation of the said first gain of the said receive pathway, $$K1_{TX}\text{finalest} = \frac{K1_{TX}est1 + K1_{TX}est2}{2},$$

$$K2_{TX}\text{finalest} = 1 - K1_{TX}\text{finalest}^*,$$

* represents the conjugate operator, $$K1_{TX}est1 = \frac{R_{f_7}(\text{seq}_1) \cdot E_{f_8}^*(\text{seq}_2) - \frac{R_{f_7}(\text{seq}_2)}{\exp(+j \cdot \varphi_{\Delta f})} \cdot E_{f_8}^*(\text{seq}_2)}{R_{f_7}(\text{seq}_1) \cdot [E_{f_8}^*(\text{seq}_2) - E_{f_9}(\text{seq}_2)] - \frac{R_{f_7}(\text{seq}_2)}{\exp(+j \cdot \varphi_{\Delta f})} \cdot [E_{f_8}^*(\text{seq}_1) - E_{f_9}(\text{seq}_1)]}$$

$$K1_{TX}est2 = \frac{R_{f_2}(\text{seq}_1) \cdot E_{f_9}^*(\text{seq}_2) - \frac{R_{f_2}(\text{seq}_2)}{\exp(+j \cdot \varphi_{\Delta f})} \cdot E_{f_9}^*(\text{seq}_2)}{R_{f_2}(\text{seq}_1) \cdot [E_{f_9}^*(\text{seq}_2) - E_{f_8}(\text{seq}_2)] - \frac{R_{f_2}(\text{seq}_2)}{\exp(+j \cdot \varphi_{\Delta f})} \cdot [E_{f_9}^*(\text{seq}_1) - E_{f_8}(\text{seq}_1)]}$$

$E_{f_j}(\text{seq}_i)$ represents a spectral component of one of the said first sequences $\text{seq}_i$ at the frequency $f_j$, $R_{f_j}(\text{seq}_i)$ represents a spectral component of one of the said second sequences $\text{seq}_i$ at the frequency $f_j$, and $\varphi_{\Delta f}$ represents a phase shift caused by a difference between the said first transposition frequency and the said second transposition frequency.

Advantageously the step of determining the said imperfections of the said receive pathway comprises the use of the following relations:

$$\begin{cases} \varphi_{RX}est = \text{Angle}[K1_{RX}\text{finalest} - K2_{RX}\text{finalest}*] \\ g_{RX}est = |K1_{RX}est - K2_{RX}est*| \end{cases}$$

where:

$\varphi_{RX}$ represents an estimation of the said second phase shift of the said receive pathway, $g_{RX}$ represents an estimation of the said second gain of the said receive pathway, $$K1_{RX}\text{finalest} = \frac{K1_{RX}est(\text{seq}_1) + [1 - K2_{RX}^*est(\text{seq}_1)] + K1_{RX}est(\text{seq}_2) + [1 - K2_{RX}^*est(\text{seq}_2)]}{4},$$

$$K2_{RX}\text{finalest} = 1 - K1_{RX}\text{finalest}^*,$$

* represents the conjugate operator, $$K1_{RX}est(\text{seq}_i) = \frac{R_{f_7}(\text{seq}_i)}{R_{f_7}(\text{seq}_i) + R_{f_1}^*(\text{seq}_i)},$$

$$K2_{RX}est(\text{seq}_i) = \frac{R_{f_6}(\text{seq}_i)}{R_{f_6}(\text{seq}_i) + R_{f_2}^*(\text{seq}_i)},$$

$R_{f_j}(\text{seq}_i)$ represents a spectral component of one of the said second sequences $\text{seq}_i$ at the frequency $f_j$.

Apparatus, which comprises a transmit pathway and a receive pathway. The transmit pathway comprises a first device for frequency transposition of an analogue sequence to an analogue signal, using a first transposition frequency. The receive pathway comprises a second device for frequency transposition of an analogue signal to an analogue sequence, using a second transposition frequency. The apparatus furthermore comprises a calculation device able to implement the method of the invention.

Advantageously the transmit pathway furthermore comprises a device for converting first digital sequences to the said first analogue sequences. Moreover the receive pathway furthermore comprises a device for converting the second analogue sequences to second digital sequences and the calculation device is furthermore able to implement a method of the invention.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION

Figure 1:
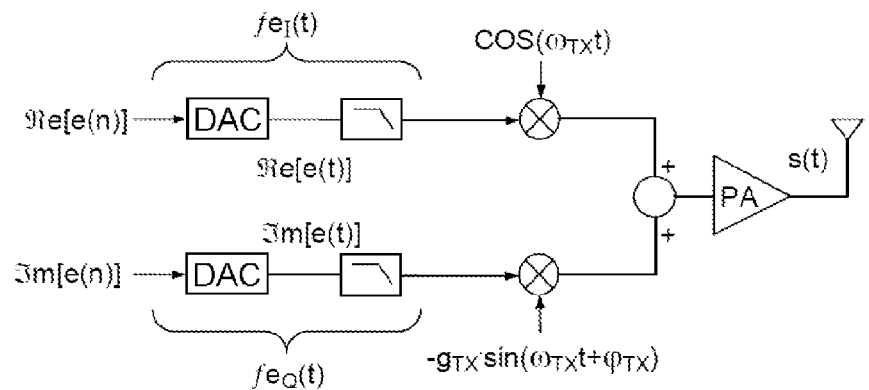
FIG. 1 presents a transmit pathway exhibiting an imbalance between the I pathway and the Q pathway.
Figure 2:
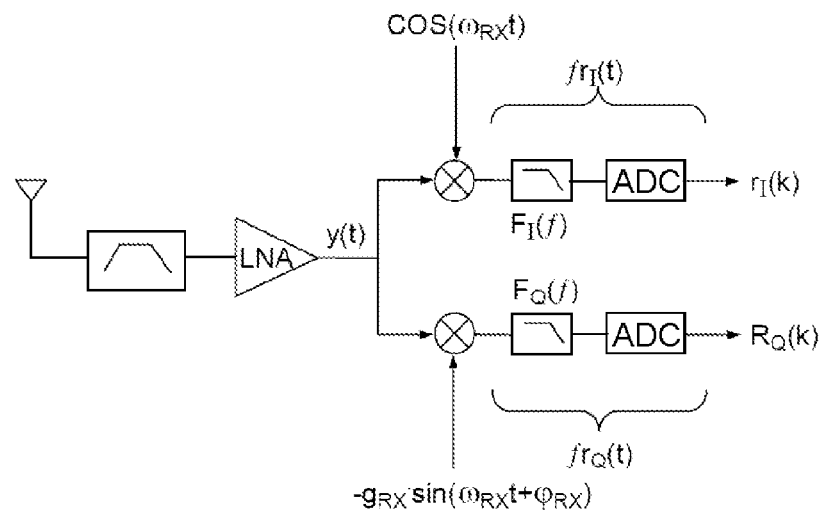
FIG. 2 presents a receive pathway exhibiting an imbalance between the I pathway and the Q pathway.
Figure 3:
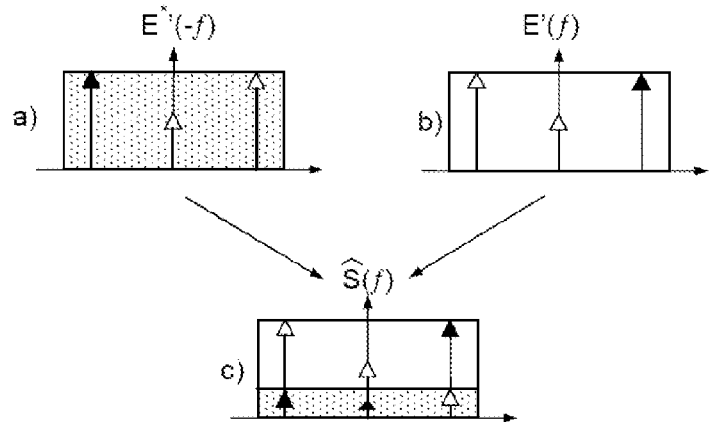
FIG. 3 presents a first illustration of the effect of the imbalance between the I pathway and the Q pathway of a transmit pathway.
Figure 4:
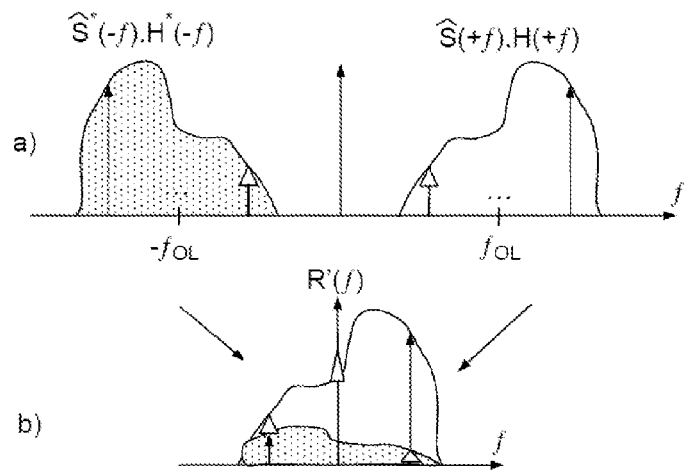
FIG. 4 presents a second illustration of the effect of the imbalance between the I pathway and the Q pathway of a receive pathway.
Figure 5:
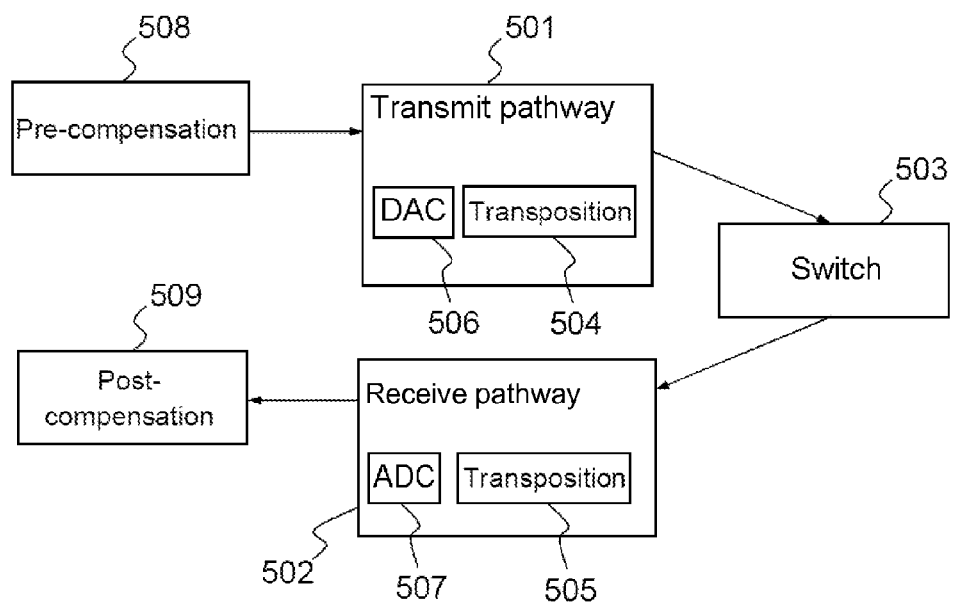
FIG. 5 presents a system comprising a pre-compensation and a post-compensation.

FIG. 5 therefore presents the system known in the prior art and used by the method of the invention.

Within the framework of our invention the second transposition frequency is shifted by a known value from the first transposition frequency.

The minimum value of this shift depends on the carrier frequency and on the instability of the values of these frequencies. This instability is generally caused by an inaccuracy of the local oscillators. In the case of a UHF transmission at 200 MHz and of an instability of 2 ppm of the local oscillators, the minimum value of the shift would be about 40 kHz.

The maximum value of this shift depends on the sampling frequencies of the digital-analogue converters 506 and analogue-digital converters 507. In the case of converters having a frequency of 80 MHz, the maximum frequency would be about 10 MHz.

Under the above conditions, a typical value would be of the order of 1 MHz.

Figure 6:
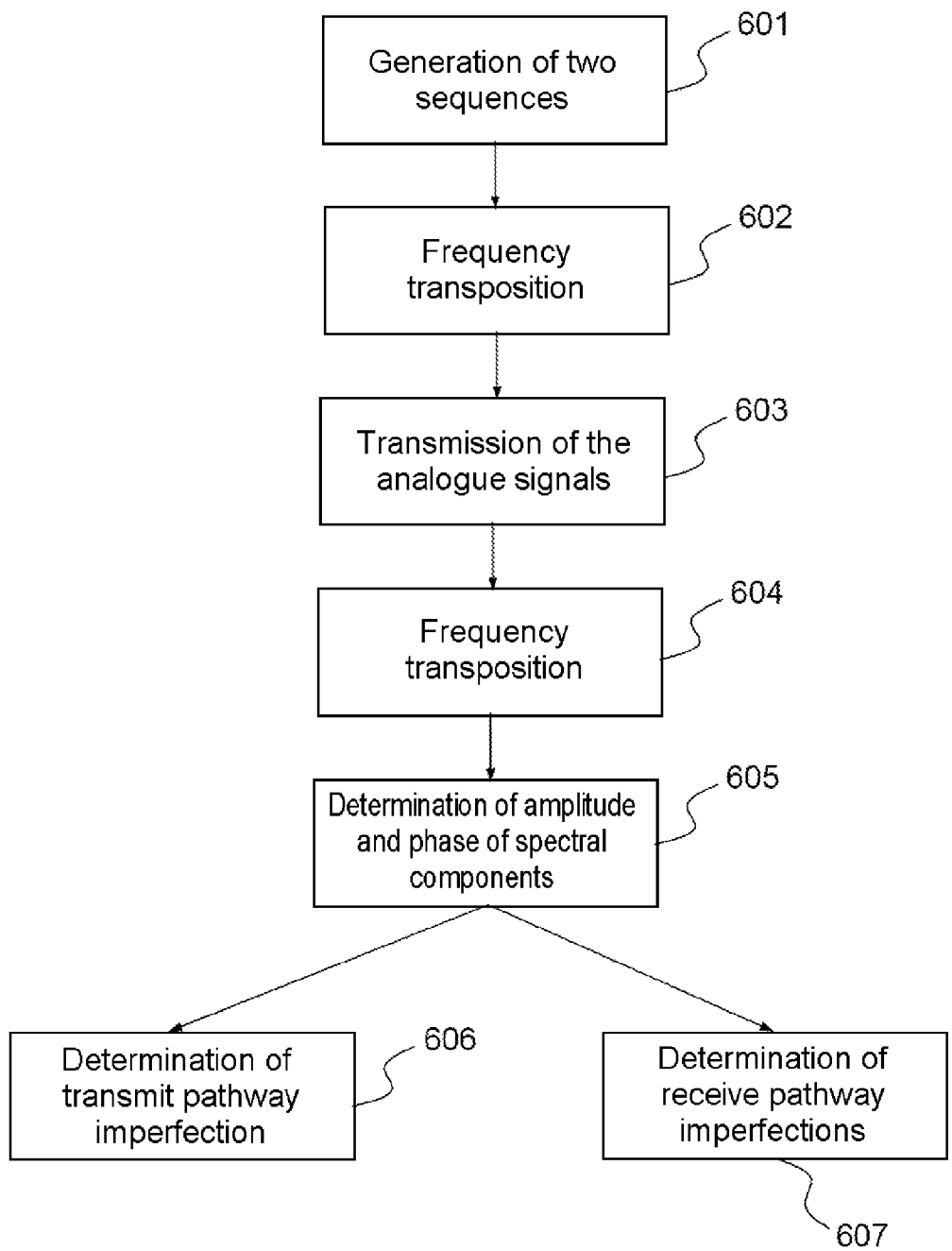
FIG. 6 presents the method described in the invention.

The method according to the invention is described in FIG. 6 and comprises a set of sequential steps.

A step 601 of generating at least two different first analogue sequences.

The two analogue sequences must comply with the following conditions so that the method can operate correctly:
  These two sequences must not be zero sequences.
  One of the sequences must not be an amplified version of the other sequence.
  One of the sequences must not be a delayed version of the other sequence.

In order to carry out this estimation it is for example possible to use a dual-tone signal whose frequencies are f and −f. The phases of these sequences must be different for each of the two first sequences. For example, it is possible to contemplate the transmission of two first dual-tone sequences. One of these first sequences consists of a solely real sequence, and the other first sequence consists of a solely imaginary sequence. The real sequence is achievable using the I part of the transmit pathway and the imaginary sequence is achievable using the Q part of the transmit pathway.

It is also possible to use a signal of multi-tone type. It is thus possible to use a signal of OFDM (Orthogonal Frequency Division Multiplexing) type, SC-FDE (Single-Carrier Frequency Domain Equalization) type, or any other type of signals with cyclic prefix. It is also possible to use a signal of FBMC (Filter Bank MultiCarrier) type.

The analogue sequences can be generated firstly in digital and then the digital-analogue converter 506 is used to generate the analogue sequences from the digital sequences.

The method thereafter comprises a step 602 of frequency transposition of the analogue sequences. This transposition is carried out by the transmit pathway.

Thereafter a step 603, of transmitting the analogue signals from the transmit pathway to the receive pathway, is carried out.

Step 604 allows the frequency transposition of the analogue signals received to second analogue sequences. This step is carried out by the receive pathway.

The following step is a step 605 of calculating a first amplitude and a first phase, of the spectral components of the first analogue sequences, associated with various frequencies of interest.

This step also allows the calculation of a second amplitude and of a second phase, of the spectral components of the second analogue sequences, associated with various frequencies of interest.

This step can also be carried out after conversion of the second analogue sequences to second digital sequences. This conversion is carried out by the analogue-digital converters 507 of the receive pathway.

Finally the method comprises the following two independent steps:
  a step 606 of determining the imperfections of the transmit pathway on the basis solely of the first amplitudes, first phases, second amplitudes and second phases associated with the frequencies of interest, and
  a step 607 of determining the imperfections of the receive pathway on the basis solely of the second amplitudes and second phases associated with the frequencies of interest.

These last two steps therefore allow the determination of the value of the imperfections of the transmit pathway and of the receive pathway. These imperfections are characterized by the following parameters:

For the IQ modulator or transmit pathway:
  the parameter relating to the quadrature loss in terms of phase,
  the parameter relating to the quadrature loss in terms of amplitude, and For the IQ demodulator or receive pathway:
  the parameter relating to the quadrature loss in terms of phase,
  the parameter relating to the quadrature loss in terms of amplitude.

Figure 7:
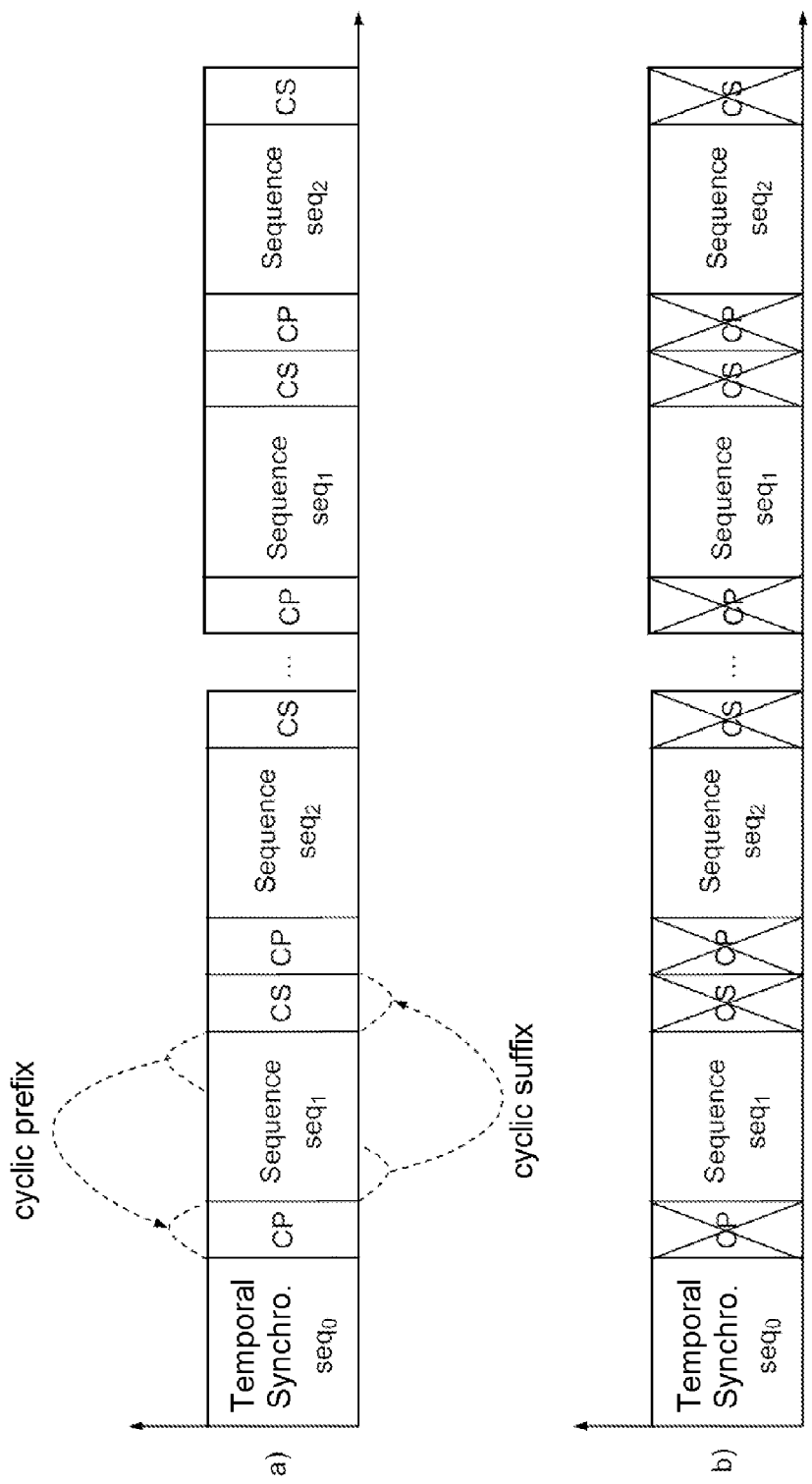
FIG. 7 presents an example of the sequence used by the method of the invention.

In one mode of implementation, presented in FIG. 7, the two first sequences are united into one and the same longer sequence termed the general sequence and composed of three parts:
  A first part which allows a synchronization between the transmit pathway and the receive pathway (Temporal Syncro $seq_0$ in FIG. 7).
  A second and a third part which allow the estimation of the parameters representative of the imperfections of the transmit and receive pathways. These second and third parts each comprise one of the first sequences. (Sequence $seq_1$ and Sequence $seq_2$ in FIG. 7).

Note that it is possible to repeat a part of the second and the third part of the signal so as to improve the fineness of the estimations (CP for Cyclic Prefix and CS for Cyclic Suffix in FIG. 7). This is carried out by adding a cyclic prefix and/or postfix.

Moreover as the carrier frequency of the transmit converter is slightly different from the carrier frequency of the receive converter, and by virtue also of the use of the parts two and three of the general sequence, it is possible to very easily separate the parameters to be estimated, and a simple spectral analysis makes it possible to do so. Note that in general a spectral analysis requires the calculation of one or more Fourier transforms, but in the proposed scheme this is not necessary since the parameters of interest are situated at seven precise frequencies known in advance. It then suffices to determine the phase and the amplitude of the spectral components associated with these frequencies. It is for example possible to multiply the second sequence received by the receive pathway by complex exponentials whose frequencies are known beforehand, so as to determine the value of these parameters.

The transposition frequencies of the transmit pathway and of the receive pathway are different. This difference is denoted $$\Delta f = k_1 \frac{f_{smp}}{Nfft} = \frac{\omega_{TX} - \omega_{RX}}{2\pi},$$

with $$k_1 \in \left[ -\frac{Nfft}{2} + 1; \frac{Nfft}{2} \right]$$

which is a normalized and integer frequency, while complying with the condition $$|k_1| + |k_2| \le \frac{Nfft}{2} - 1.$$

In the case of a dual-tone signal the two frequencies are then the following frequencies:

$$f_8 = -k_2 \frac{f_{smp}}{Nfft} \text{ and } f_9 = k_2 \frac{f_{smp}}{Nfft}.$$

$$\text{with } k_2 \in \left[ +1; \frac{Nfft}{2} - 1 \right].$$

$f_{smp}$ represents the frequency of sampling of the analogue signal by the receive pathway conversion device.

$\omega_{TX}$ represents the angular frequency of the transmit pathway transposition device.

$\omega_{RX}$ represents the angular frequency of the receive pathway transposition device.

Nfft represents the size of the block of samples which is used to calculate the second amplitudes and second phases, of the spectrum of the second analogue sequences.

The frequencies of interest as well as the frequencies transmitted are defined with respect to the receive pathway sampling frequency.

In one mode of implementation the two steps 606 and 607 of determining the imperfections of the transmit and receive pathway use the modelling of the analogue signal received by the receive voice r(t) as follows:

$$r(t) = $$
$$(h(t) \otimes [[e(t) + DC_{TX}(t)] \cdot K1_{TX} \cdot K1_{RX} + [e(t) + DC_{TX}(t)]^* \cdot K2_{TX}^* \cdot K1_{RX}]) \cdot$$
$$\exp(+j2\pi\Delta_f t) +$$
$$(h^*(t) \otimes [[e(t) + DC_{TX}(t)]^* \cdot K1_{TX}^* \cdot K2_{RX} + [e(t) + DC_{TX}(t)] \cdot$$
$$K2_{TX} \cdot K2_{RX}]) \cdot \exp(-j2\pi\Delta_f t) + DC_{RX}(t)$$

h(t) represents the impulse response of the switch (or of the association of the elements of the propagation channel transmit pathway and of the elements of the receive pathway) 503 connecting the transmit pathway and the receive pathway.

e(t) represents the signal which has been transmitted by the transmit pathway.

$DC_{RX}(t)$ represents the equivalent analogue signal corresponding to the continuous component not desired in the receive pathway.

$DC_{TX}(t)$ represents the equivalent analogue signal corresponding to the continuous component not desired in the transmit pathway.

$K1_{TX}(t)$ and $K2_{TX}(t)$ depend on the coefficients of the transmit pathway imbalance model.

$$K1_{TX}(t) = \frac{1 + g_{TX} e^{+j\varphi_{TX}}}{2}$$

$$K2_{TX}(t) = \frac{1 - g_{TX} e^{-j\varphi_{TX}}}{2}$$

$K1_{RX}(t)$ and $K2_{RX}(t)$ depend on the coefficients of the receive pathway imbalance model.

$$K1_{RX}(t) = \frac{1 + g_{RX} e^{-j\varphi_{RX}}}{2}$$

$$K2_{RX}(t) = \frac{1 - g_{RX} e^{+j\varphi_{RX}}}{2}$$

$\otimes$ represents a convolution.

* represents the conjugate operator.

The discrete Fourier transform, or more simply a spectral analysis conducted on some of the spectral components, of the received signal r(t), consisting of the second sequences, makes it possible to recover the information carried at the following seven frequencies:

$$f_1 = (-k_2 - k_1) \frac{f_{smp}}{Nfft},$$

$$f_2 = (-k_2 + k_1) \frac{f_{smp}}{Nfft},$$

$$f_3 = -k_1 \frac{f_{smp}}{Nfft},$$

$$f_4 = 0,$$

-continued $$f_5 = +k_1 \frac{f_{smp}}{Nfft},$$

$$f_6 = (+k_2 - k_1) \frac{f_{smp}}{Nfft} \text{ and}$$

$$f_7 = (+k_2 + k_1) \frac{f_{smp}}{Nfft}.$$

The spectral components of the signal received for these seven frequencies depend on the spectral components of the transmitted signal and the frequency response of the switch connecting the transmit pathway and the receive pathway at the frequencies $$f_8 = -k_2 \frac{f_{smp}}{Nfft} \text{ and } f_9 = k_2 \frac{f_{smp}}{Nfft}.$$

Thus spectral components of the two second sequences at these seven frequencies make it possible to obtain the following system:

$$\begin{cases} R_{f_1}(seq_i) = \left[E^*_{f_9}(seq_i) \cdot K1^*_{TX} + E_{f_8}(seq_i) \cdot K2_{TX}\right] \cdot K2_{RX} \cdot H^*_{f_9}(seq_i) \\ R_{f_2}(seq_i) = \left[E_{-k_2}(seq_i) \cdot K1_{TX} + E^*_{f_9}(seq_i) \cdot K2^*_{TX}\right] \cdot K1_{RX} \cdot H_{f_8}(seq_i) \\ R_{f_3}(seq_i) = \left[DC^*_{TX}(seq_i) \cdot K1^*_{TX} + DC_{TX}(seq_i) \cdot K2_{TX}\right] \cdot K2_{RX} \cdot H^*_0(seq_i) \\ R_{f_4}(seq_i) = DC_{RX}(seq_i) \\ R_{f_5}(seq_i) = \left[DC_{TX}(seq_i) \cdot K1_{TX} + DC^*_{TX}(seq_i) \cdot K2^*_{TX}\right] \cdot K1_{RX} \cdot H_0(seq_i) \\ R_{f_6}(seq_i) = \left[E^*_{f_8}(seq_i) \cdot K1^*_{TX} + E_{f_9}(seq_i) \cdot K2_{TX}\right] \cdot K2_{RX} \cdot H^*_{f_8}(seq_i) \\ R_{f_7}(seq_i) = \left[E_{f_9}(seq_i) \cdot K1_{TX} + E^*_{f_8}(seq_i) \cdot K2^*_{TX}\right] \cdot K1_{RX} \cdot H_{f_9}(seq_i) \end{cases}$$

$H_{f_j}(seq_i)$ represents a spectral component of the frequency response of the switch connecting the transmit pathway and the receive pathway at the frequency $f_j$ and during the transmission of the sequence $seq_i$.

$E_{f_j}(seq_i)$ represents a spectral component of one of the first sequences transmitted $(seq_i)$ at the frequency $f_j$.

$R_{f_j}(seq_i)$ represents a spectral component of one of the second sequences received $(seq_i)$ at the frequency $f_j$.

$$f_8 = -k_2 \frac{f_{smp}}{Nfft} \text{ and } f_9 = k_2 \frac{f_{smp}}{Nfft}.$$

In order to determine the IQ imbalance of the transmit converter use is made of the spectral components of the second sequences received $seq_1$ and $seq_2$ at the frequency $$f_7 = (+k_2 + k_1) \frac{f_{smp}}{Nfft}.$$

The following system is then formed:

$$\begin{cases} R_{f_7}(seq_1) = \left[E_{f_9}(seq_1) \cdot K1_{TX} + E^*_{f_8}(seq_1) \cdot K2^*_{TX}\right] \cdot K1_{RX} \cdot H_{f_9}(seq_1) \\ R_{f_7}(seq_2) = \left[E_{f_9}(seq_2) \cdot K1_{TX} + E^*_{f_8}(seq_2) \cdot K2^*_{TX}\right] \cdot K1_{RX} \cdot H_{f_9}(seq_2) \end{cases}$$

The frequency responses of the equivalent channel $H_k(seq_1)$ and $H_k(seq_2)$ are not identical, since the transposition frequencies of the transmit pathway and of the receive pathway are different. Indeed, the sequence received at the output of the receive converter is not situated on zero frequency, but at a frequency $$\Delta f = k_1 \frac{f_{smp}}{Nfft} = \frac{\omega_{TX} - \omega_{RX}}{2\pi} = f_5.$$

Figure 8:
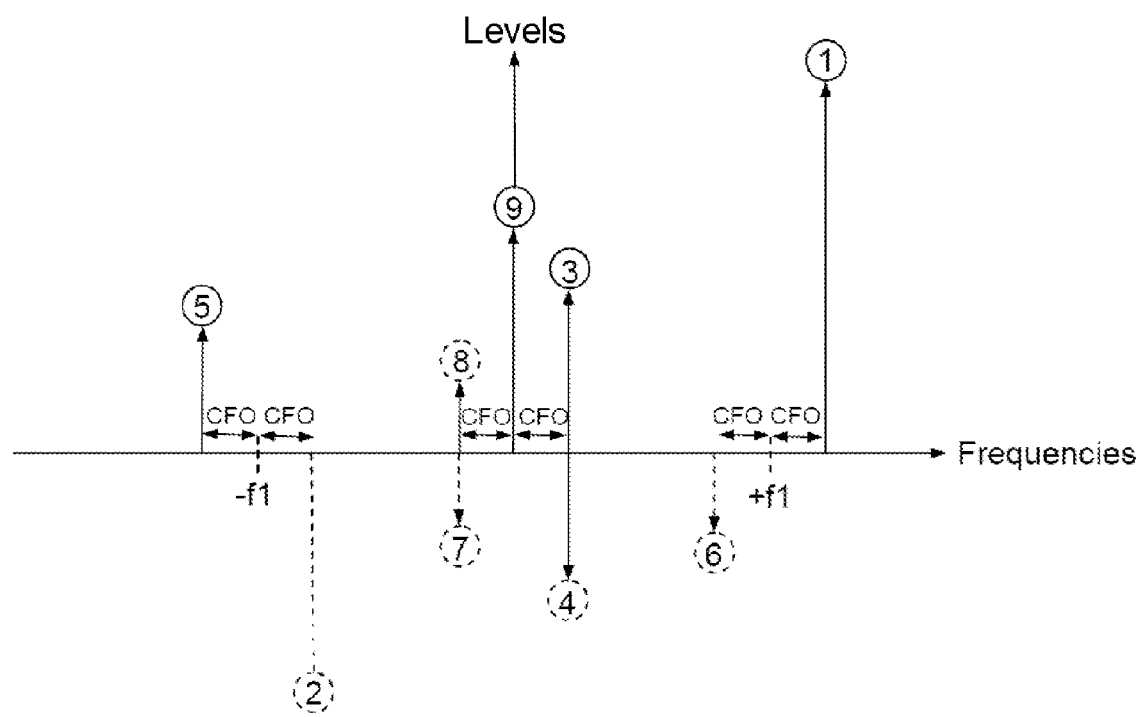
FIG. 8 presents the spectral components of the sequences received.

This is particularly presented in FIG. 8. In this figure is presented the spectrum of the signal received when the signal transmitted is a pure exponential of frequency+$f_5$ and of amplitude A. CFO represents the shift in frequency between the converter of the transmit pathway and the converter of the receive pathway.

This frequency shift involves a phase rotation $\phi_{\Delta f}$ between the sequences $seq_1$ and $seq_2$:

$$\varphi_{\Delta f} = 2\pi \cdot k_1 \cdot \frac{Nfft + N_{CP} + N_{CS}}{Nfft}$$

Thus the relation between the frequency responses of the equivalent channels of the sequences $seq_1$ and $seq_2$ is as follows:

$$H_{f_j}(seq_2) = H_{f_j}(seq_1) \cdot e^{+j\phi_{\Delta f}}$$

The above system can then be rewritten in this form:

$$\begin{cases} R_{f_7}(seq_1) = \left[E_{f_9}(seq_1) \cdot K1_{TX} + E^*_{f_8}(seq_1) \cdot K2^*_{TX}\right] \cdot K1_{RX} \cdot H_{f_9}(seq_1) \\ R_{f_7}(seq_2) = \left[E_{f_9}(seq_2) \cdot K1_{TX} + E^*_{f_8}(seq_2) \cdot K2^*_{TX}\right] \cdot \\ \qquad\qquad K1_{RX} \cdot H_{f_9}(seq_1) \cdot \exp(+j \cdot \varphi_{\Delta f}) \end{cases}$$

The following intermediate variables are then defined:

$$\begin{cases} A_{f_9} = K1_{TX} \cdot K1_{RX} \cdot H_{f_9}(seq_1) \\ B_{f_9} = K2^*_{TX} \cdot K1_{RX} \cdot H_{f_9}(seq_1) \end{cases}$$

The Fourier transform of the two second sequences received $seq_1$ and $seq_2$ may then be rewritten in the form of a system of two equations in two unknowns $A_{f_9}$ and $B_{f_9}$:

$$\begin{cases} R_{f_7}(seq_1) = E_{f_9}(seq_1) \cdot A_{k_2} + E^*_{f_8}(seq_1) \cdot B_{f_9} \\ \dfrac{R_{f_7}(seq_2)}{\exp(+j \cdot \varphi_{\Delta f})} = E_{f_9}(seq_2) \cdot A_{k_2} + E^*_{f_8}(seq_2) \cdot B_{f_9} \end{cases}$$

This system possesses a unique solution if $$\frac{E_{f_9}(seq_1)}{E^*_{f_8}(seq_1)} \neq \frac{E_{f_9}(seq_2)}{E^*_{f_8}(seq_2)}.$$

Stated otherwise, a solution exists if all of the following conditions hold:

$seq_1 \neq 0$ and $seq_2 \neq 0$.

$seq_1$ is not a delayed version of $seq_2$.

$seq_1$ is not an amplified or attenuated version of $seq_2$.

The solution of this system is then:

$$\begin{cases} A_{f_9} = \dfrac{R_{f_7}(\text{seq}_1) \cdot E^*_{f_8}(\text{seq}_2) - \dfrac{R_{f_7}(\text{seq}_2)}{\exp(+j \cdot \varphi_{\Delta f})} \cdot E^*_{f_8}(\text{seq}_2)}{E^*_{f_8}(\text{seq}_2) E_{f_9}(\text{seq}_1) - E^*_{f_9}(\text{seq}_2) E^*_{f_8}(\text{seq}_1)} \\ B_{f_9} = \dfrac{\dfrac{R_{f_7}(\text{seq}_2)}{\exp(+j \cdot \varphi_{\Delta f})} \cdot E_{f_9}(\text{seq}_1) - R_{f_7}(\text{seq}_1) \cdot E^*_{f_9}(\text{seq}_2)}{E^*_{f_8}(\text{seq}_2) E_{f_9}(\text{seq}_1) - E^*_{f_9}(\text{seq}_2) E^*_{f_8}(\text{seq}_1)} \end{cases}$$

By using the fact that $K1_{TX}(t) + K2_{TX}^*(t) = 1$, it is noted that $K1_{TX}$ can be estimated on the basis of the knowledge of $A_{f_9}$ and $B_{f_9}$ in the following manner:

$$K1_{TX}\text{est}1 = \frac{A_{f_9}}{A_{f_9} + B_{f_9}}$$

Finally, the expanded version of the above equation is:

$$K1_{TX}\text{est}1 = \frac{R_{f_7}(\text{seq}_1) \cdot E^*_{f_8}(\text{seq}_2) - \dfrac{R_{f_7}(\text{seq}_2)}{\exp(+j \cdot \varphi_{\Delta f})} \cdot E^*_{f_8}(\text{seq}_2)}{R_{f_7}(\text{seq}_1) \cdot [E^*_{f_8}(\text{seq}_2) - E_{f_9}(\text{seq}_2)] - \dfrac{R_{f_7}(\text{seq}_2)}{\exp(+j \cdot \varphi_{\Delta f})} \cdot [E^*_{f_8}(\text{seq}_1) - E_{f_9}(\text{seq}_1)]}$$

It is also possible to apply the same scheme at the frequencies:

$$f_1 = (-k_2 - k_1)\frac{f_{smp}}{Nfft},$$

$$f_2 = (-k_2 + k_1)\frac{f_{smp}}{Nfft}, \text{ and}$$

$$f_6 = (+k_2 - k_1)\frac{f_{smp}}{Nfft},$$

to estimate $K1_{TX}$ using another mode of implementation. However, the estimations carried out on the frequencies $$f_6 = (+k_2 - k_1)\frac{f_{smp}}{Nfft} \text{ and } f_1 = (-k_2 - k_1)\frac{f_{smp}}{Nfft}$$

turn out to be rather unreliable and will not be used since the levels of power received at these frequencies are too low.

The estimation of $K1_{TX}$ applied at the frequency $$f_2 = (-k_2 + k_1)\frac{f_{smp}}{Nfft}$$

is as follows:

$$K1_{TX}\text{est}2 = \frac{R_{f_2}(\text{seq}_1) \cdot E^*_{f_9}(\text{seq}_2) - \dfrac{R_{f_2}(\text{seq}_2)}{\exp(+j \cdot \varphi_{\Delta f})} \cdot E^*_{f_9}(\text{seq}_2)}{R_{f_2}(\text{seq}_1) \cdot [E^*_{f_9}(\text{seq}_2) - E_{f_8}(\text{seq}_2)] - \dfrac{R_{f_2}(\text{seq}_2)}{\exp(+j \cdot \varphi_{\Delta f})} \cdot [E^*_{f_9}(\text{seq}_1) - E_{f_8}(\text{seq}_1)]}$$

Exploiting the fact that two estimates of the IQ imbalance of the transmit converter are available, the final estimation is as follows:

$$K1_{TX}\text{finalest} = \frac{K1_{TX}\text{est}1 + K1_{TX}\text{est}2}{2} \text{ and}$$

$$K2_{TX}\text{finalest} = 1 - K1_{TX}\text{finalest}^*$$

The estimations of the first phase $\phi_{TX}$ and of the first gain $g_{TX}$ of the imperfections of the transmit converter are then determined, obtained using the following formulae:

$$\begin{cases} \varphi_{TX}\text{est} = +\text{Angle}[K1_{TX}\text{finalest} - K2_{TX}\text{finalest}*] \\ g_{TX}\text{est} = |K1_{TX}\text{finalest} - K2_{TX}\text{finalest}*| \end{cases}$$

Thus this estimation of the parameters of the imperfections of the transmit pathway is obtained using the spectral components of the first sequences at the following first frequencies of interest:

$$f_8 = -k_2 \frac{f_{smp}}{Nfft} \text{ and}$$

$$f_9 = k_2 \frac{f_{smp}}{Nfft}.$$

And the spectral components of the second sequences at the following second frequencies of interest:

$$f_2 = (-k_2 + k_1)\frac{f_{smp}}{Nfft},$$

$$f_7 = (+k_2 + k_1)\frac{f_{smp}}{Nfft},$$

The use of a multi-tone signal in place of a dual-tone signal makes it possible to enhance the reliability of the estimation of the IQ imbalance by averaging the estimations over the whole set of pairs of sub-carriers in the following manner:

$$K1_{TX}\text{est}1 = \sum_{p=1}^{P} \frac{R_{(+K_p+k_1)}(\text{seq}_1) \cdot E^*_{-K_p}(\text{seq}_2) - \dfrac{R_{(+K_p+k_1)}(\text{seq}_2)}{\exp(+j \cdot \varphi_{\Delta f})} \cdot E^*_{-K_p}(\text{seq}_2)}{R_{(+K_p+k_1)}(\text{seq}_1) \cdot [E^*_{-K_p}(\text{seq}_2) - E_{+K_p}(\text{seq}_2)] - \dfrac{R_{(+K_p+k_1)}(\text{seq}_2)}{\exp(+j \cdot \varphi_{\Delta f})} \cdot [E^*_{-K_p}(\text{seq}_1) - E_{+K_p}(\text{seq}_1)]}$$

and $$K1_{TX}\text{est}2 = \sum_{p=1}^{P} \frac{R_{(-K_p+k_1)}(\text{seq}_1) \cdot E^*_{+K_p}(\text{seq}_2) - \dfrac{R_{(-K_p+k_1)}(\text{seq}_2)}{\exp(+j \cdot \varphi_{\Delta f})} \cdot E^*_{+K_p}(\text{seq}_2)}{R_{(-K_p+k_1)}(\text{seq}_1) \cdot [E^*_{+K_p}(\text{seq}_2) - E_{-K_p}(\text{seq}_2)] - \dfrac{R_{(-K_p+k_1)}(\text{seq}_2)}{\exp(+j \cdot \varphi_{\Delta f})} \cdot [E^*_{+K_p}(\text{seq}_1) - E_{-K_p}(\text{seq}_1)]}$$

In these equations P is the set of pairs of sub-carriers used to do the training. In the case of a dual-tone signal P=1, in the case of a multitone signal (more than 2 tones) P=Number of tones/2. $K_P$ corresponds to the frequencies of the multitone signal with 2P tones.

The estimation of the IQ imbalance of the receive pathway is carried out via the signals received at the following twin frequencies:

$$f_1 = (-k_2 - k_1)\frac{f_{smp}}{Nfft}, \text{ and}$$

$$f_7 = (+k_2 + k_1)\frac{f_{smp}}{Nfft}.$$

It is then possible to determine the following equation, so as to circumvent the contribution of the IQ imbalance of the transmit pathway:

$$R_{f_7}(seq_i) + R^*_{f_1}(seq_i) = [E_{f_9}(seq_i) \cdot K1_{TX} + E^*_{f_8}(seq_i) \cdot K2^*_{TX}] \cdot$$
$$K1_{RX} \cdot H_{f_9}(seq_i) +$$
$$[E_{f_9}(seq_i) \cdot K1_{TX} + E^*_{f_8}(seq_i) \cdot K2^*_{TX}] \cdot$$
$$K2^*_{RX} \cdot H_{f_9}(seq_i)$$
$$= [E_{f_9}(seq_i) \cdot K1_{TX} + E^*_{f_8}(seq_i) \cdot K2^*_{TX}] \cdot$$
$$H_{f_9}(seq_i) \cdot [K1_{RX} + K2^*_{RX}]$$
$$= [E_{f_9}(seq_i) \cdot K1_{TX} + E^*_{f_8}(seq_i) \cdot K2^*_{TX}] \cdot$$
$$H_{f_9}(seq_i)$$

Thus, $K1_{RX}$ can be estimated directly by virtue of the following formulation:

$$K1_{RX}est(seq_i) = \frac{R_{f_7}(seq_i)}{R_{f_7}(seq_i) + R^*_{f_1}(seq_i)}$$

It may be noted that the Fourier transforms of the sequences at the following frequencies:

$$f_2 = (-k_2 + k_1)\frac{f_{smp}}{Nfft}, \text{ and}$$

$$f_6 = (+k_2 - k_1)\frac{f_{smp}}{Nfft}$$

possess the same property:

$$R_{f_6}(seq_i) + R^*_{f_2}(seq_i) = [E_{f_8}*(seq_i) \cdot K1^*_{TX} + E_{f_9}(seq_i) \cdot K2_{TX}] \cdot$$
$$K2_{RX} \cdot H^*_{f_8}(seq_i) +$$
$$[E^*_{f_8}(seq_i) \cdot K1^*_{TX} + E_{f_9}(seq_i) \cdot K2_{TX}] \cdot$$
$$K1^*_{RX} \cdot H^*_{f_8}(seq_i)$$
$$= [E^*_{f_8}(seq_i) \cdot K1^*_{TX} + E_{f_9}(seq_i) \cdot K2_{TX}] \cdot$$
$$H^*_{f_9}(seq_i) \cdot [K1^*_{RX} + K2_{RX}]$$
$$= [E^*_{f_8}(seq_i) \cdot K1^*_{TX} + E_{f_9}(seq_i) \cdot K2_{TX}] \cdot$$
$$H^*_{f_9}(seq_i)$$

And in the same manner as above, $K2_{RX}$ can be estimated directly by virtue of the following formulation:

$$K2_{RX}est(seq_i) = \frac{R_{f_6}(seq_i)}{R_{f_6}(seq_i) + R_{f_2}*(seq_i)}$$

Since no condition is required on the value of the dual-tone signals to be transmitted $E_{f_9(seq_i)}$ and $E_{f_8(seq_i)}$ (apart from the zero values), the IQ imbalance of the receive pathway can therefore be estimated at one and the same time on the sequence $seq_1$ and $seq_2$.

Finally, it is possible to exploit the fact that 4 estimates of the IQ imbalance of the receive pathway are available, by consolidating them in the following manner:

$$K1_{RX}\text{finalest} = \frac{K1_{RX}est(seq_1) + [1 - K2^*_{RX}est(seq_1)] +}{4}$$
$$\frac{K1_{RX}est(seq_2) + [1 - K2^*_{RX}est(seq_2)]}{4}$$

And $$K2_{RX}\text{finalest} = 1 - K1_{RX}\text{finalest}^*$$

The estimation of the phase $\phi_{TX}$ and gain $g_{TX}$ of the imperfections of the receive converter is then determined, obtained using the following formulae:

$$\begin{cases} \varphi_{RX}est = +\text{Angle}[K1_{RX}\text{finalest} - K2_{RX}\text{finalest}*] \\ g_{RX}est = |K1_{RX}est - K2_{RX}est*| \end{cases}$$

Thus this estimation of the parameters of the imperfections of the receive pathway is obtained using the spectral components of the first sequences at the following first frequencies of interest:

$$f_8 = -k_2 \frac{f_{smp}}{Nfft} \text{ and } f_9 = k_2 \frac{f_{smp}}{Nfft}.$$

And the spectral components of the second sequences at the following second frequencies of interest:

$$f_1 = (-k_2 - k_1)\frac{f_{smp}}{Nfft},$$

$$f_7 = (+k_2 + k_1)\frac{f_{smp}}{Nfft}.$$

The use of a multi-tone signal in place of a dual-tone signal makes it possible to enhance the reliability of the estimation of the IQ imbalance of the receive converter by averaging the estimations over the whole set of pairs of sub-carriers in the following manner:

$$K1_{RX}est(seq_i) = \sum_{p=1}^{P} \frac{R_{(+K_p+k_1)}(seq_i)}{R_{(+K_p+k_1)}(seq_i) + R^*_{(-K_p-k_1)}(seq_i)} \text{ and}$$

$$K2_{RX}est(seq_i) = \sum_{p=1}^{P} \frac{R_{(+K_p+k_1)}(seq_i)}{R_{(+K_p-k_1)}(seq_i) + R^*_{(-K_p+k_1)f}(seq_i)}$$

The invention claimed is:

1. A method for determining imperfections of a transmit pathway and of a receive pathway of an apparatus, the transmit pathway comprising a first device for frequency transposition of an analogue sequence to an analogue signal, using a first transposition frequency, said receive pathway comprising a second device for frequency transposition of an analogue signal to an analogue sequence, using a second transposition frequency different from the first transposition frequency, said method comprising the following sequential steps:

generating at least two different first analogue sequences,
performing a frequency transposition at said first transposition frequency of the first analogue sequences to analogue signals, by the transmit pathway, transmitting the analogue signals of the transmit pathway to the receive pathway, performing a frequency transposition from said second transposition frequency of the analogue signals received to second analogue sequences, by the receive pathway, calculating first amplitudes and first phases, of a plurality of spectral components of at least two of the first analogue sequences at first frequencies of interest and second amplitudes and second phases, of a plurality of spectral components of at least two of the second analogue sequences at second frequencies of interest, said method comprising at least one of the following two independent steps:

determining the imperfections of the transmit pathway on the basis solely of the first amplitudes, first phases, second amplitudes and second phases, and determining the imperfections of the receive pathway on the basis solely of the second amplitudes and second phases.

2. The method according to claim 1, wherein at least two of the first analogue sequences are non-zero, are not a delayed version of one another and are not an amplified version of one another.

3. The method according to claim 1, wherein one of the first analogue sequences includes an imaginary sequence and another of the first sequences includes a real sequence.

4. The method according to claim 1, wherein at least two of the first analogue sequences are multi-tone sequences of OFDM-Orthogonal Frequency Division Multiplexing-type or of SC-FDE-Single-Carrier Frequency Domain Equalization-type or of FBMC-Filter Bank MultiCarrier modulation-type or analogue sequences using a cyclic prefix and/or cyclic postfix.

5. The method according to claim 1, wherein the imperfections of the transmit pathway are modelled by a first gain and a first phase shift affecting the analogue signal during its transmission by the transmit pathway.

6. The method according to claim 1, wherein the imperfections of the receive pathway are modelled by a second gain and a second phase shift affecting the analogue signal during its reception by the receive pathway.

7. The method according to claim 1, wherein:

said transmit pathway furthermore comprises a device for converting first digital sequences to the first analogue sequences, said receive pathway furthermore comprises a device for converting the second analogue sequences to second digital sequences, said first frequencies of interest are:

$$f_8 = -k_2 \frac{f_{smp}}{N_{fft}} \text{ and } f_9 = k_2 \frac{f_{smp}}{N_{fft}} = -f_8;$$

where:

$$k_2 \in \left[ +1; \frac{N_{fft}}{2} - 1 \right],$$

$f_{smp}$ represents a sampling frequency of the device for converting the second analogue sequences to the second digital sequences and Nfft represents a number of samples used to calculate the second amplitudes and the second phases, of the spectral components of the second analogue sequence or sequences.

8. The method according to claim 1, wherein:

said transmit pathway furthermore comprises a device for converting first digital sequences to the first analogue sequences, said receive pathway furthermore comprises a device for converting the second analogue sequences to second digital sequences, said second frequencies of interest are:

$$f_1 = (-k_2 - k_1) \frac{f_{smp}}{N_{fft}},$$

$$f_2 = (-k_2 + k_1) \frac{f_{smp}}{N_{fft}},$$

$$f_6 = (+k_2 - k_1) \frac{f_{smp}}{N_{fft}} = -f_2,$$

$$f_7 = (+k_2 + k_1) \frac{f_{smp}}{N_{fft}} = -f_1,$$

where:

$$k_1 \in \left[ -\frac{N_{fft}}{2} + 1; \frac{N_{fft}}{2} \right], k_1 \frac{f_{smp}}{N_{fft}} = \Delta f,$$

$\Delta f$ represents the difference between the first transposition frequency and the second transposition frequency, $$k_2 \in \left[ +1; \frac{N_{fft}}{2} - 1 \right],$$

$f_{smp}$ represents the sampling frequency of the device for converting the second analogue sequences to the second digital sequences and Nfft represents a number of samples used to calculate the second amplitudes and the second phases, of the spectral components of the second analogue sequence or sequences.

9. The method according to claim 5, wherein the step of determining the imperfections of the transmit pathway comprises the use of the following relations:

$$\begin{cases} \varphi_{TX} est = \text{Angle}[K1_{TX}\text{finalest} - K2_{TX}\text{finalest}*] \\ g_{TX} est = |K1_{TX}\text{finalest} - K2_{TX}\text{finalest}*| \end{cases}$$

where:

$\phi_{TX}$ represents an estimation of the first phase shift of the transmit pathway, $g_{TX}$ represents an estimation of the first gain of the receive pathway, $$K1_{TX}\text{finalest} = \frac{K1_{TX}est1 + K1_{TX}est2}{2},$$

$$K2_{TX}\text{finalest} = 1 - K1_{TX}\text{finalest}*,$$

* represents the conjugate operator, $$K1_{TX}est1 = \frac{R_{f_7}(\text{seq}_1) \cdot E^*_{f_8}(\text{seq}_2) - \frac{R_{f_7}(\text{seq}_2)}{\exp(+j \cdot \varphi_{\Delta f})} \cdot E^*_{f_8}(\text{seq}_2)}{R_{f_7}(\text{seq}_1) \cdot [E^*_{f_8}(\text{seq}_2) - E_{f_9}(\text{seq}_2)] - \frac{R_{f_7}(\text{seq}_2)}{\exp(+j \cdot \varphi_{\Delta f})} \cdot [E^*_{f_8}(\text{seq}_1) - E_{f_9}(\text{seq}_1)]}$$

-continued $$K1_{TX}est2 = \frac{R_{f_2}(\text{seq}_1) \cdot E^*_{f_9}(\text{seq}_2) - \frac{R_{f_2}(\text{seq}_2)}{\exp(+j \cdot \varphi_{\Delta f})} \cdot E^*_{f_9}(\text{seq}_2)}{R_{f_2}(\text{seq}_1) \cdot [E^*_{f_9}(\text{seq}_2) - E_{f_8}(\text{seq}_2)] - \frac{R_{f_2}(\text{seq}_2)}{\exp(+j \cdot \varphi_{\Delta f})} \cdot [E^*_{f_9}(\text{seq}_1) - E_{f_8}(\text{seq}_1)]}$$

$E_{f_t}(\text{seq}_i)$ represents a spectral component of one of the first sequences $\text{seq}_i$ at the frequency $f_j$, $R_{f_t}(\text{seq}_i)$ represents a spectral component of one of the second sequences $\text{seq}_i$ at the frequency $f_j$, and $\varphi_{\Delta f}$ represents a phase shift caused by a difference between the first transposition frequency and the second transposition frequency.

10. The method according to claim 6, wherein said step of determining said imperfections of said receive pathway comprises the use of the following relations:

$$\begin{cases} \varphi_{RX}est = \text{Angle}[K1_{RX}\text{finalest} - K2_{RX}\text{finalest}*] \\ g_{RX}est = |K1_{RX}est - K2_{RX}est*| \end{cases}$$

where:

$\varphi_{RX}$ represents an estimation of the second phase shift of the receive pathway, $g_{RX}$ represents an estimation of the second gain of the receive pathway, $$K1_{RX}\text{finalest} = \frac{K1_{RX}est(\text{seq}_1) + [1 - K2^*_{RX}est(\text{seq}_1)] + K1_{RX}est(\text{seq}_2) + [1 - K2^*_{RX}est(\text{seq}_2)]}{4},$$

$K2_{RX}\text{finalest} = 1 - K1_{RX}\text{finalest}^*$,

* represents the conjugate operator, $$K1_{RX}est(\text{seq}_i) = \frac{R_{f_7}(\text{seq}_i)}{R_{f_7}(\text{seq}_i) + R^*_{f_1}(\text{seq}_i)},$$

$$K2_{RX}est(\text{seq}_i) = \frac{R_{f_6}(\text{seq}_i)}{R_{f_6}(\text{seq}_i) + R^*_{f_2}(\text{seq}_i)},$$

$R_{f_t}(\text{seq}_i)$ represents a spectral component of one of the second sequences $\text{seq}_i$ at the frequency $f_j$.

11. An apparatus, comprising a transmit pathway and a receive pathway, wherein:

said transmit pathway comprises a first device for frequency transposition of an analogue sequence to an analogue signal, using a first transposition frequency, said receive pathway comprises a second device for frequency transposition of an analogue signal to an analogue sequence, using a second transposition frequency, said apparatus furthermore comprises a calculation device able to implement a method for determining imperfections of a transmit pathway and of a receive pathway, the method comprising the following sequential steps:

generating at least two different first analogue sequences, performing a frequency transposition from said first transposition frequency of the first analogue sequences to analogue signals, by the transmit pathway, transmitting the analogue signals of the transmit pathway to the receive pathway, performing a frequency transposition from said second transposition frequency of the analogue signals received to second analogue sequences, by the receive pathway, calculating first amplitudes and first phases, of a plurality of spectral components of at least two of the first analogue sequences at first frequencies of interest and second amplitudes and second phases, of a plurality of spectral components of at least two of the second analogue sequences at second frequencies of interest, said method comprising at least one of the following two independent steps:

determining the imperfections of the transmit pathway on the basis solely of the first amplitudes, first phases, second amplitudes and second phases, and determining the imperfections of the receive pathway on the basis solely of the second amplitudes and second phases.

12. A radio transmission apparatus, comprising a transmit pathway and a receive pathway, wherein:

said transmit pathway comprises a first device for frequency transposition of an analogue sequence to an analogue signal, using a first transposition frequency, and a device for converting first digital sequences to the first analogue sequences, said receive pathway comprises a second device for frequency transposition of an analogue signal to an analogue sequence, using a second transposition frequency, and a device for converting the second analogue sequences to second digital sequences, said apparatus furthermore comprises a calculation device able to implement a method for determining imperfections of a transmit pathway and of a receive pathway, the method comprising the following sequential steps:

generating at least two different first analogue sequences, performing a frequency transposition from said first transposition frequency of the first analogue sequences to analogue signals, by the transmit pathway, transmitting the analogue signals of the transmit pathway to the receive pathway, performing a frequency transposition from said second transposition frequency of the analogue signals received to second analogue sequences, by the receive pathway, calculating first amplitudes and first phases, of a plurality of spectral components of at least two of the first analogue sequences at first frequencies of interest and second amplitudes and second phases, of a plurality of spectral components of at least two of the second analogue sequences at first frequencies of interest, said method comprising at least one of the following two independent steps:

determining the imperfections of the transmit pathway on the basis solely of the first amplitudes, first phases, second amplitudes and second phases, and determining the imperfections of the receive pathway on the basis solely of the second amplitudes and second phases.

* * * * *